March 5, 1935.  L. L. SMITH  1,993,631
PLANTING JAR
Filed June 21, 1934
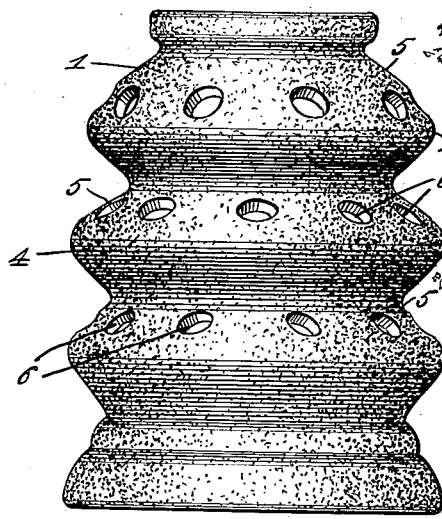
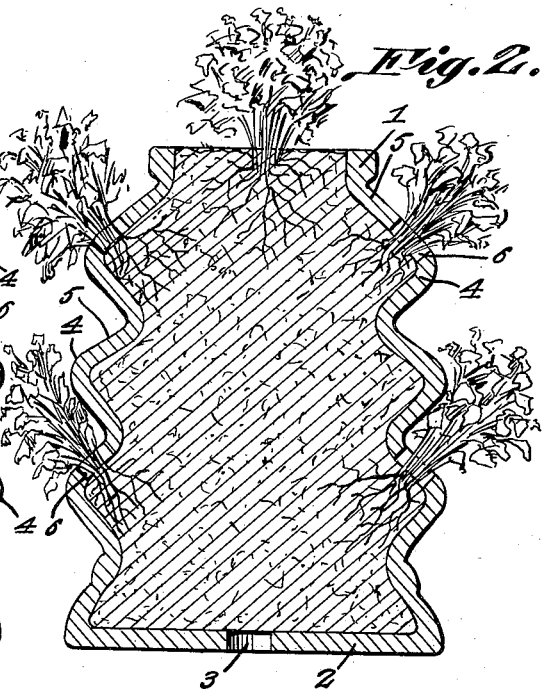
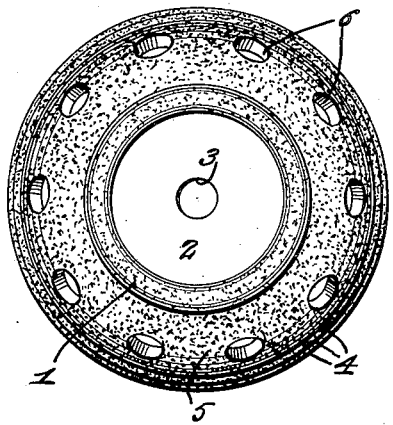
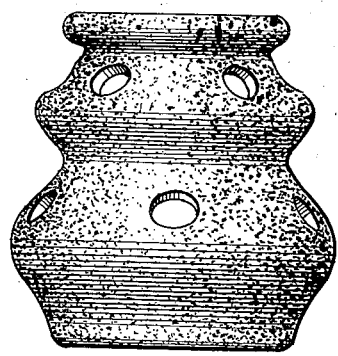
Lloyd L. Smith, INVENTOR
BY Victor J. Evans & Co.
ATTORNEY Patented Mar. 5, 1935

1,993,631

UNITED STATES PATENT OFFICE 1,993,631

PLANTING JAR

Lloyd L. Smith, Minneapolis, Minn.

Application June 21, 1934, Serial No. 731,759

1 Claim. (Cl. 47—34)

This invention relates to jars or containers especially adapted for the growing of plants, and has for the primary object the provision of a device of the above stated character whereby a plurality of plants may be nourished or fed by soil confined within the device with complete separation of the plants to facilitate the growth of the plants and with the plants arranged or grouped to be attractive and render a novel display for the plants and their flowers or blooms.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a jar constructed in accordance with my invention.

Figure 2 is a vertical sectional view illustrating the same.

Figure 3 is a top plan view illustrating the device.

Figure 4 is a side elevation illustrating a slight modified form of my invention.

Referring in detail to the drawing, the numeral 1 indicates a body of a container or jar and which may be constructed from any material suitable for the purpose and of various designs or shapes. An integral wall 2 closes the lower end of the body 1 and is provided with a drain opening 3. The upper end of the body is open to permit filling of the body with soil or earth and for applying water to the soil or earth when necessary to assure proper nourishment of growths or plants fed by the soil. As shown in Figure 2, the soil substantially fills the body and a plant may be planted in the soil by way of the upper end of the body as customary. A plurality of spaced offsets 4 are formed in the walls of the body and each provides oppositely inclined walls 5 and the uppermost wall of each offset is provided with spaced openings 6 to expose the soil within the body and permit the planting of a plant or growth in the soil by way of each opening 6, thereby segregating or separating the plants from each other, still permitting them to nourish or feed from the same soil within the body and to grow upwardly and outwardly from the walls of the body which aids in the growth of the plants as well as permitting the latter to present artistic or ornamental appearances to the device.

The body may be made in various shapes other than that shown in Figures 1 to 3, another form or shape being suggested by Figure 4, the principal construction therein being the same as the form heretofore described.

Having described the invention, I claim:

A jar comprising a body having its upper end open and its lower end closed by a wall provided with a drain opening, a plurality of spaced offsets formed in the walls of the body adapted to be filled with soil placed within the body and providing to the body series of oppositely inclined walls, the upper inclined walls being provided with spaced openings to expose the soil within the offset portions and permit planting of plants in the soil by way of each opening so that said plants may grow and develop upwardly and outwardly from the body.

LLOYD L. SMITH.